No. 840,208.　　　　　　　　　　　　　PATENTED JAN. 1, 1907.
M. V. HARTONG.
WINDMILL.
APPLICATION FILED APR. 27, 1906.
2 SHEETS—SHEET 2.
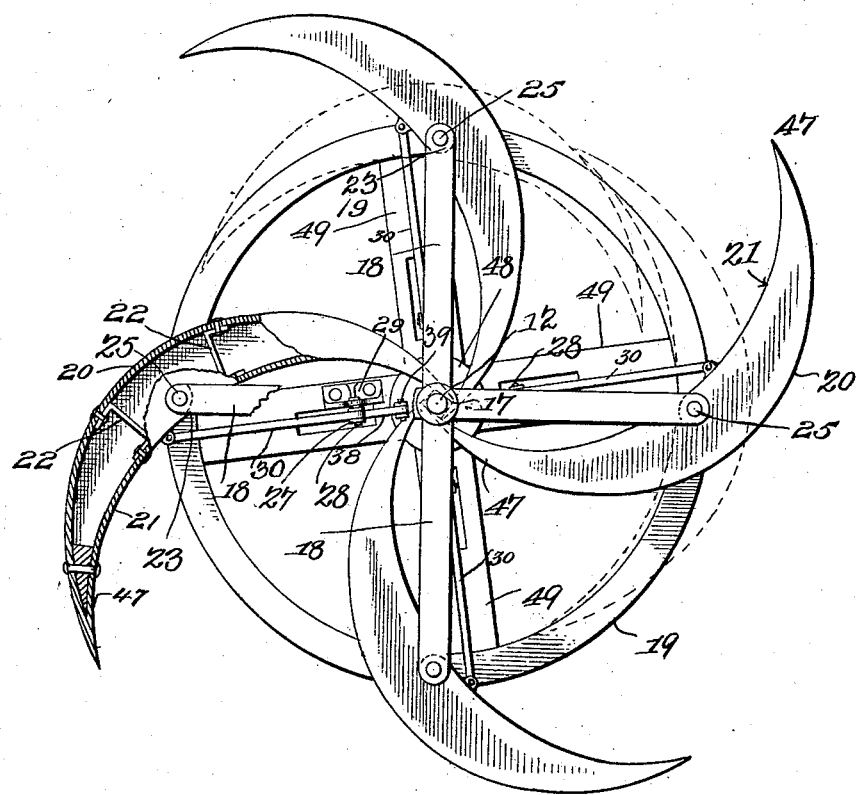
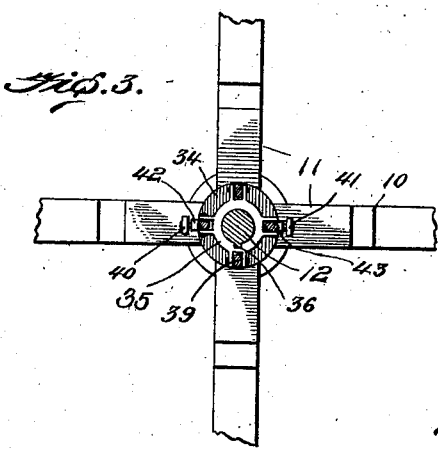
WITNESSES:
Miles V. Hartong,
INVENTOR
By C. A. Snow & Co
ATTORNEYS

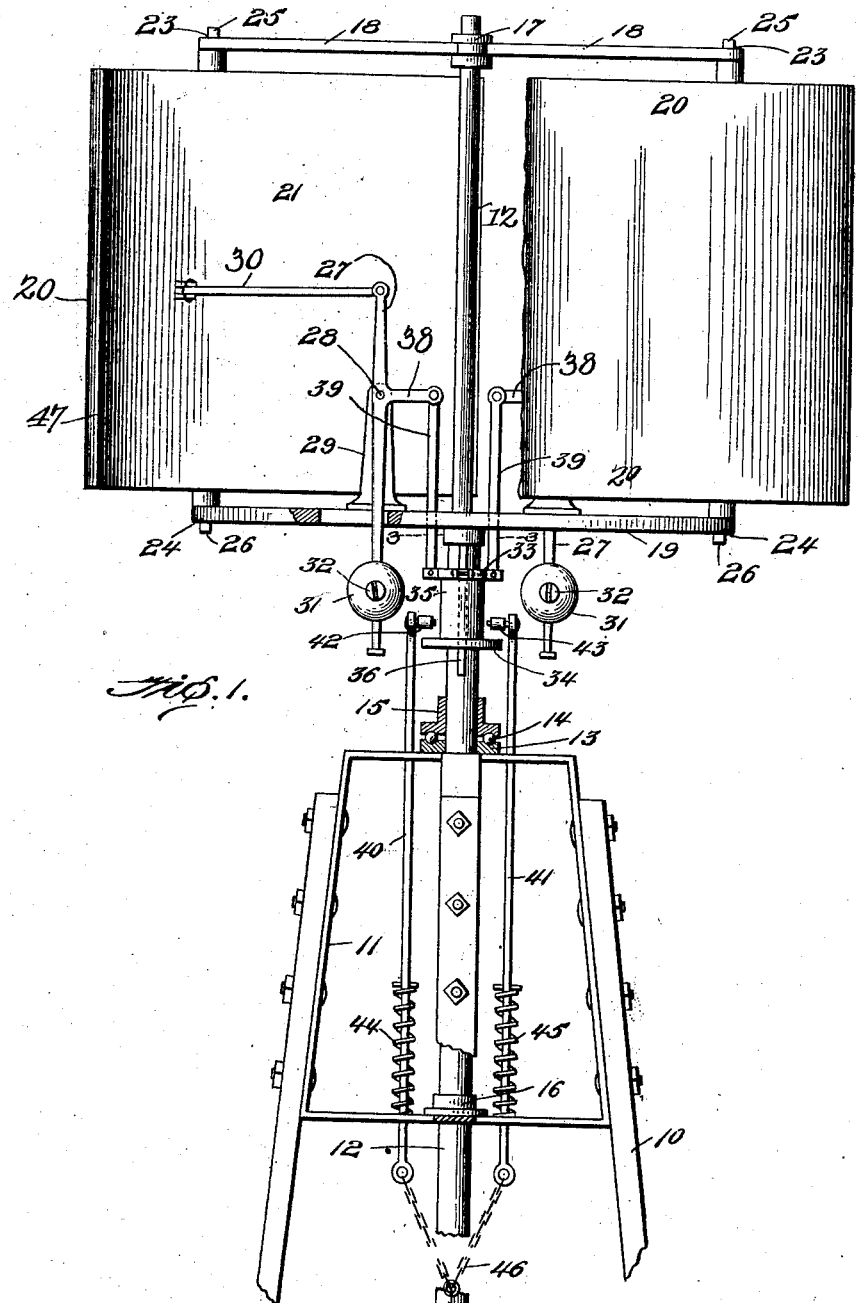

UNITED STATES PATENT OFFICE.

MILES V. HARTONG, OF PLAINFIELD, ILLINOIS.

WINDMILL.

No. 840,208.

Specification of Letters Patent.

Patented Jan. 1, 1907.

Application filed April 27, 1906. Serial No. 314,038.

*To all whom it may concern:*

Be it known that I, MILES V. HARTONG, a citizen of the United States, residing at Plainfield, in the county of Will and State of Illinois, have invented a new and useful Windmill, of which the following is a specification.

This invention relates to improvements in windmills, and has for its object to improve the construction and increase the efficiency of devices of this character.

With this and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

In the drawings, Figure 1 is a side elevation, partly in section, of the improved apparatus with one of the wings removed. Fig. 2 is a plan view partly in section. Fig. 3 is a section on the line 3 3 of Fig. 1.

The improved device may be erected upon any suitable structure, such as a tower, the roof of a building, or the like, which will elevate it sufficiently to receive the full force of the wind, and for the purpose of illustration is shown mounted upon a tower structure, (represented at 10.)

The improved device comprises a base-frame 11, adapted to be rigidly connected to the supporting structure—as, for instance, the tower 10—and with a vertical shaft 12, rotatively supported therein.

A collar 13 is disposed upon the upper surface of the frame 11 and surrounding the shaft 12 and provided with an annular channel for receiving bearing-balls 14, and the shaft 12 is provided with a corresponding collar 15, having an annular channel bearing over the balls 14, the two collars with their channels and the bearing-ball forming an efficient ball-bearing connection between the shaft and frame. At the lower end of the frame the shaft 12 is further supported by a bearing 16, the relatively elongated base-frame thus providing a correspondingly-elongated support to the shaft and effectually preventing displacement by the action of the wind against the windmill structure upon the upper end of the shaft.

Rigidly connected to the upper end of the shaft 12 is a hub 17, having radiating arms 18, and rigidly connected to the shaft above the frame 11 is a hub 48, having radial arms 49 and rim 19 and spaced from the hub 17 and its arms 18. The wings or "sails" of the mill are disposed between the arms 18 and rim 19.

The wings or sails of the improved structure herein described are of novel construction, each consisting of an outer curved segmental plate 20 and an inner curved segmental plate 21 of a greater radius than the outer curved plate, so that when the two plates are united at their edges 47 they form a crescent-shaped structure, as represented in Fig. 2.

The crescent-shaped wings are closed at the ends and provided interiorly with suitable braces (indicated at 22) at intervals.

The terminals of the arms 18 are provided with bearings at 23, and the rim 19 is provided with corresponding bearings at 24, the two sets of bearings 23 24 being disposed in vertical alinement and adapted to receive studs 25 26, extending from the ends of the wings, the wings being thus mounted to swing between the arms 18 and rim 19.

Any number of arms 18 and wings 20 21 may be employed, the number depending upon the size of the mill; but for the purpose of illustration four of the arms and a corresponding number of wings are shown.

The curved wings will be so propotioned relative to the lengths of the arms 18 and the size of the rim 19 that when in closed position, as indicated by dotted lines in Fig. 2, the wings will interfold to form substantially a cylindrical structure against which the wind will not be effective. On the other hand, when the curved wings are distended or in open position, as shown in full lines in Fig. 2, they present a relatively large area to the wind, which rapidly rotates them and the arms, frame, and shaft associated therewith and produces an effective and powerful windmill structure.

A simply-constructed automatic governor apparatus is attached to the device and a simply-constructed means for throwing the wings into and out of the wind, and thus controlling the speed or entirely stopping the motion, as may be required.

The governor mechanism consists of a plurality of substantially vertical levers 27, one for each of the wings and each pivoted intermediate its ends at 28 to standards 29, rising from the arms 49, the upper ends of the levers being coupled by rods 30 to the wings at a short distance from the vertical lines of the studs 25 26 and the lower ends of the levers extending below the arms 49 and each provided with a weight 31, the weights adjustable upon the levers by set-screws 32.

The relative positions of the levers 27 and the lengths of the rods 30 will be so arranged that when the levers are held in vertical position by the gravity of the weights 31 the wings will be supported in their extended or outward position, as shown in full lines in Fig. 2, and while the motion is normal the weights will produce no effect upon the wings; but any abnormal increase of speed will cause the weights to be moved outwardly by centrifugal force, and thus draw the wings inwardly and decrease the area presented to the wind and correspondingly decreasing the speed, the weighted levers thus serving as effectual automatic governors to the wings to control the speed and insure the uniformity of the motion. The weights 31 being adjustable vertically upon the levers 27, the force exerted thereby may be easily controlled, as will be obvious.

Slidably disposed upon the shaft 12 are two disks 33 34, spaced apart and connected by a shell 35, the disks and shell rotatable with the shaft, but movable longitudinally thereon over a feather 36 on the shaft.

Extending from each of the levers 27 is a lateral arm 38, and pivoted to the free ends of the arms are rods 39, the latter extending through the plate 19 and coupled to the disk 33, so that the vertical movement of the disk upon the shaft will be communicated to the levers 27.

Extending through the frame 11 are spaced rods 40 41, having rollers 42 43, extending between the disks 33 34, the rods being supported yieldably in their upward position by springs 44 45, bearing at their lower ends upon the bottom members of the frame 11.

The rods 40 41 are connected at their lower ends to a flexible element, such as a chain, (represented at 46,) convenient to the hand of the operator. The rods 40 41 will be supported by the springs 44 45 normally in upward position or with the rollers 42 43 out of engagement with the disk 34, the space between the disks 33 34 being sufficient to permit a considerable vertical movement of the disks and the connecting-shell 35 without coming in contact with the rollers 42 43. Thus the presence of the disks 33 34 and connecting-shell 35 and their connections to the levers 27 does not interfere with the automatic operation of the governor mechanism under the control of the weights 31; but when it is required to throw the wings out of the wind mechanically this can quickly be accomplished by simply drawing downwardly upon the chain 46, which action causes the rollers 42 43 to bear upon the disk 34 and depress the rods 39 and cause them to forcibly operate the levers 27 and draw the wings inwardly and dispose them in their cylindrical form, as shown by dotted lines in Fig. 2. The wings are thus under the complete control of the operator, who can easily set the wings at any desired point by simply fastening the pull-chain 46 at any desired point, and thus hold the rollers 42 43 in contact with the disk 34 or withdraw the wings entirely from the influence of the wind, as may be desired.

The apparatus is simple in construction, strong and durable, may be inexpensively manufactured and of any suitable material, size, or capacity, and operates effectually for the purposes described.

Having thus described the invention, what is claimed as new is—

1. In a windmill, a plurality of segmental wings arranged to form a substantially cylindrical structure when in closed position, a plurality of swinging levers associated with said wings and provided with lateral arms, coupling means between said levers and wings, weights connected to said levers and operating to maintain the same yieldably in position and to move the wings toward a closed position when the weighted levers are distended, a member slidably disposed relative to said wings and provided with a lateral flange, coupling means between said member and the lateral lever-arms, rods having rollers bearing over said lateral flange, and means for operating said rods.

2. In a windmill, a plurality of segmental wings arranged to form a substantially cylindrical structure when in closed position, a plurality of swinging levers associated with said wings and provided with lateral arms, coupling means between said levers and wings, weights connected to said levers and operating to maintain the same slidably in position and to move the wings toward a closed position when the weighted levers are distended, a member slidably disposed relative to said wings, and means for operating said member.

3. In a windmill, a plurality of wings formed of segmental outer plates and segmental inner plates of greater radius than the outer plates and connected thereto at the edges and arranged to form a substantially cylindrical structure when in closed position, means for supporting said wings yieldably in open position, and means for moving said wings toward a closed position.

4. In a windmill, a base-frame, a shaft supported for rotation in said frame, bearing-frames spaced apart on said shaft, segmental wings swinging between said bearing-frames, levers swinging upon one of said bearing-frames and provided with lateral arms, means for movably coupling said levers to said wings, weights adjustably connected to said levers, a member slidable upon said shaft, coupling means between said member and the lateral arms of said levers, and means for operating said member.

5. In a windmill, a base-frame, a shaft supported for rotation in said frame, bearing-frames spaced apart on said shaft, segmental wings swinging between said bearing-frames, levers swinging upon one of said bearing-frames and provided with lateral arms, means for movably coupling said levers to said wings, weights adjustably connected to said levers, a member slidable upon said shaft and provided with a lateral flange, coupling means between said member and the lateral arms of said levers, rods having rollers bearing over said flange, and means for operating said rods.

6. In a windmill, a shaft supported for rotation, bearing-frames spaced apart upon said shaft, a plurality of wings formed of segmental outer plates and segmental inner plates of greater radius than the outer plates and connected thereto at the edges, studs extending from said wings and movably engaging said bearing-frames, means for supporting said wings yieldably in open position, and means for moving said wings toward a closed position.

In testimony that I claim the foregoing as my own I have hereto affixed my signature in the presence of two witnesses.

MILES V. HARTONG.

Witnesses:
L. A. HARTONG,
IVAN R. RHODES.